(12) United States Patent
Malleshaiah

(10) Patent No.: US 8,914,382 B2
(45) Date of Patent: Dec. 16, 2014

(54) SYSTEM AND METHOD FOR GENERATION OF A DYNAMIC SOCIAL PAGE

(75) Inventor: Prasannakumar Jobigenahally Malleshaiah, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/251,666

(22) Filed: Oct. 3, 2011

(65) Prior Publication Data

US 2013/0086078 A1    Apr. 4, 2013

(51) Int. Cl.
    G06F 17/30    (2006.01)
    G06Q 30/02    (2012.01)
    G06Q 50/00    (2012.01)

(52) U.S. Cl.
    CPC ............ *G06Q 30/02* (2013.01); *G06Q 30/0255* (2013.01); *G06Q 30/0269* (2013.01); *G06Q 50/01* (2013.01)
    USPC ...................................................... 707/748

(58) Field of Classification Search
    USPC ........................................................ 707/748
    See application file for complete search history.

(56) References Cited

U.S. PATENT DOCUMENTS

| | | | |
|---|---|---|---|
| 6,385,619 B1 | 5/2002 | Elchstaedt et al. | |
| 7,356,461 B1 | 4/2008 | Tremblay et al. | |
| 7,536,413 B1 | 5/2009 | Mohan et al. | |
| 7,599,938 B1 * | 10/2009 | Harrison, Jr. | 705/7.29 |
| 7,904,448 B2 * | 3/2011 | Chung et al. | 707/721 |
| 8,015,173 B2 * | 9/2011 | Chipalkatti et al. | 707/708 |
| 2002/0161753 A1 * | 10/2002 | Inaba et al. | 707/3 |
| 2004/0141003 A1 | 7/2004 | Nivers et al. | |
| 2006/0161423 A1 | 7/2006 | Scott et al. | |
| 2007/0239534 A1 * | 10/2007 | Liu et al. | 705/14 |
| 2008/0306807 A1 | 12/2008 | Amento et al. | |
| 2009/0119261 A1 * | 5/2009 | Ismalon | 707/3 |
| 2009/0193014 A1 * | 7/2009 | Menezes et al. | 707/5 |
| 2009/0276459 A1 * | 11/2009 | Trout et al. | 707/104.1 |
| 2010/0094853 A1 * | 4/2010 | Telloli et al. | 707/706 |
| 2010/0205041 A1 | 8/2010 | Rathod et al. | |
| 2010/0274834 A1 | 10/2010 | Tang et al. | |
| 2011/0022606 A1 * | 1/2011 | Mason | 707/748 |
| 2011/0321175 A1 * | 12/2011 | Slater | 726/28 |
| 2012/0226701 A1 * | 9/2012 | Singh | 707/748 |

\* cited by examiner

*Primary Examiner* — Cam Truong
(74) *Attorney, Agent, or Firm* — James J. DeCarlo; Greenberg Traurig, LLP

(57) ABSTRACT

The present disclosure includes methods and systems for dynamically rendering a social page of the user based on the visiting user's interests. When a visiting user visits another user's social page, the visiting user will be presented with information from the user's social page related to interests for which the visiting user has exhibited an interest.

16 Claims, 8 Drawing Sheets

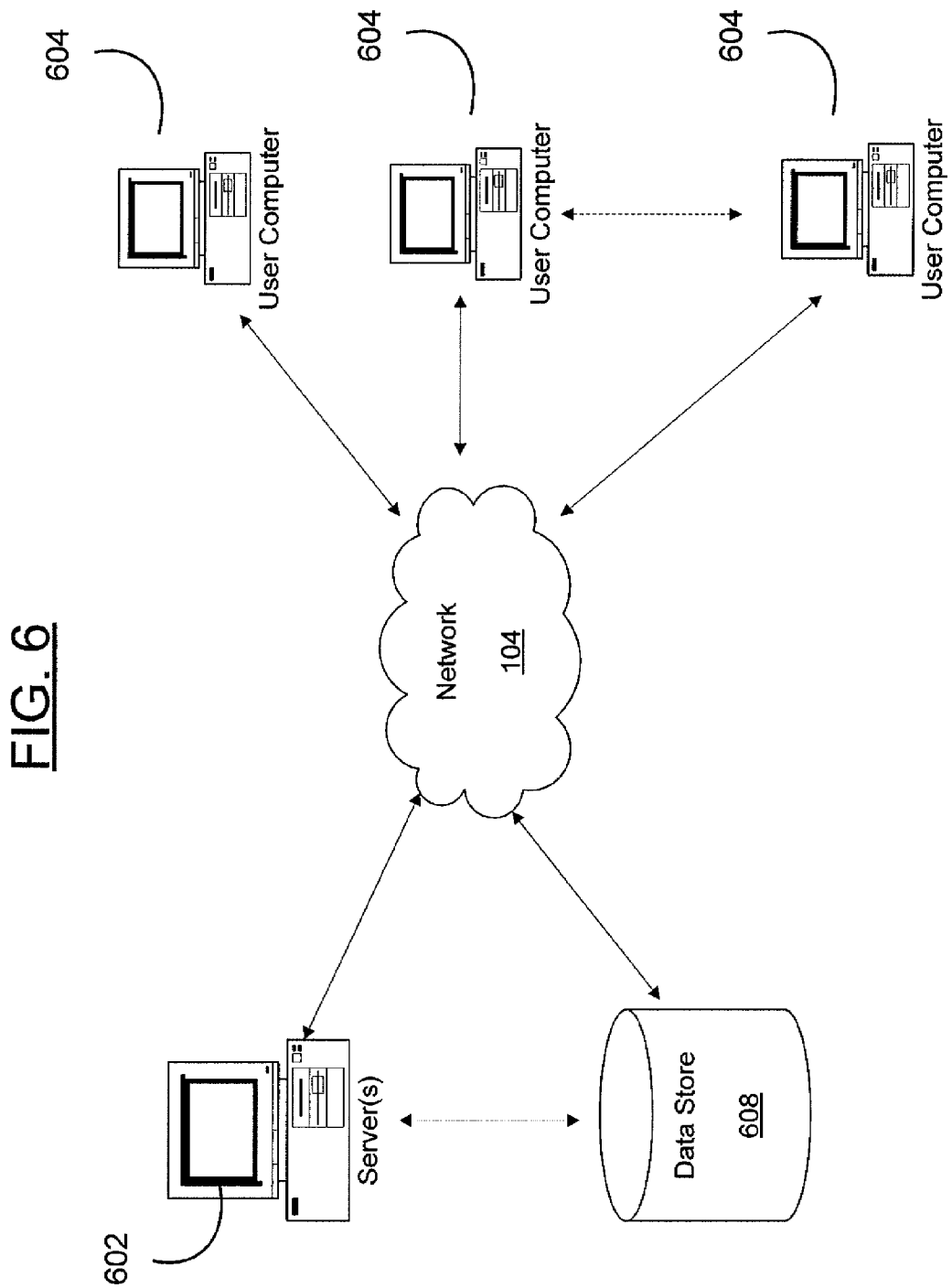

SYSTEM AND METHOD FOR GENERATION OF A DYNAMIC SOCIAL PAGE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates to systems and methods for generating a dynamic social page, and more particularly, for dynamically rendering a social networking page of a user based on a visiting user's interests.

BACKGROUND

Social networking is generally understood as an automated network in which data resides that represents an individual's personal network of friends, family, colleagues, coworkers and subsequent connections within those networks. Social networks can be utilized to find more relevant connections for dating, job networking, service referrals, activity partners, and the like.

As social networking has grown more popular, the information related to, and available to each user has become voluminous. Users may be inundated with information that does not interest the users.

SUMMARY

The present disclosure seeks to address failings in the art and to provide a system and method that identifies user information needs, and more particularly to provide a system and method for generating dynamic social pages for visiting users based on the visiting users' interests. Users can efficiently find information that interests them, such as information about their friends and community.

The present disclosure provides a system and method for social networking. This is accomplished by creating a large database of users with much personal information that users can recursively or repetitively mine. As the system obtains more information about a user it is able to use that information to uncover better ways to tailor the system to a user's needs. It should be appreciated that this will engender customer loyalty by helping users manage their communication and interactions within and among their different social circles.

In an online social network, a visiting user can visit another user's social page (homepage, wall or profile) and view the information that is permitted to be shared by the user. Currently, the visiting user can browse through the other user's social pages with the specific intent of looking for particular pieces of information. In spite of the visiting user's interests, the visiting user will still be shown the same social page as other visiting users. Since the information presented is not necessarily relevant to the visiting user's interests, this can affect the engagement, time spent, and result in a loss of a possible connection opportunity between users. As disclosed herein, the present disclosure remedies this shortcoming recognized herein by providing systems and methods for dynamically rendering a customized social page of the user based on the visiting user's interests. For example, if the visiting user is an art enthusiast, when the visiting user visits another user's social page, the visiting user will be presented with information from the user's social page related to artwork or other art related content.

In accordance with one or more embodiments, a method is provided and comprises receiving a request from a second user of a social network for a social page associated with a first user of the social network. A user interest profile associated with the second user is accessed. The user interest profile comprises interest scores associated with activity related to interests of the second user. A social networking profile of the first user is accessed. The social networking profile comprises content scores for information on the social page of the first user. The content scores that correspond to the second user's interest scores are identified and are ranked in accordance with the second user's interest scores. The information that corresponds to each of the ranked content scores is identified. According to some embodiments, the social page of the user is generated, where the social page comprises the information corresponding to the ranked content scores. According to some embodiments, the social page of the first user is modified in order to facilitate visibly display of the information corresponding to the ranked content scores.

In accordance with one or more embodiments, a system is provided, the system including at least one computing device comprising one or more processors to execute and memory to store instructions to render a dynamic social page. The system includes an activity database for storing activity by each user of a social network. The activity is stored as action data within an interest profile for each user. A relationship database stores relationship information for each user of the social network, where the relationship information includes data relating to a user's relationships with other users of the social network. A processing module, which is implemented by at least one processor within the system, scores the action data stored in the activity database for each user to produce an interest score. The interest score is stored within a category within the interest profile of a particular user within the activity database. A storage database stores content associated with each user's social page within the social network. The storage database includes content scores for the stored content, where each of the stored content and associated content scores are categorized within the storage database. The system includes a matching module, implemented by at least one processor, for matching the interest score with the content scores within a similar category. A ranking module, implemented by at least one processor, ranks the content scores that match the interest score. According to some embodiments, the system includes a publishing module, implemented by at least one processor, for generating a requested social page comprising the content corresponding to the ranked content scores.

In accordance with one or more embodiments, a non-transitory computer-readable storage medium is provided, the computer-readable storage medium tangibly storing thereon, or having tangibly encoded thereon, computer readable instructions that when executed cause at least one processor to render a dynamic social page.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosure.

FIG. 6 illustrates exemplary components that can be used in connection with one or more embodiments of the present disclosure.

DETAILED DESCRIPTION

Figure 1:
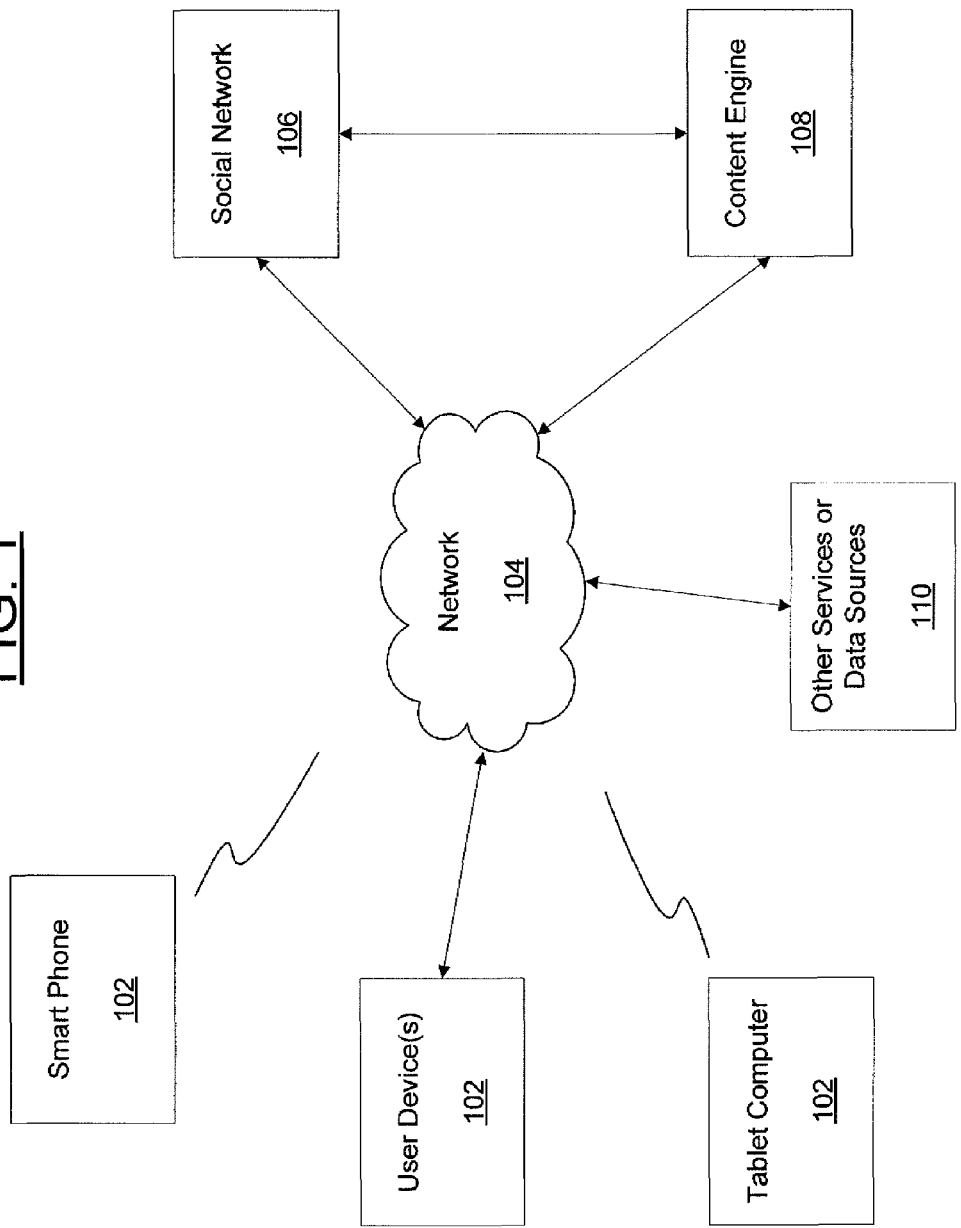
FIG. 1 illustrates an exemplary environment for generating dynamic interest based social page personalized for users of a web-based social network in accordance with the present disclosure.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

In general, the present disclosure is directed to a system, method and architecture for dynamic content personalization for users of a web-based social network. FIG. 1 illustrates an exemplary environment for generating a dynamic interest based social page personalized for users of a web-based social network. One or more user devices, such as user device 102 which is associated with a user, are in communication with a web-based social network 106 via a network 104.

For purposes of this disclosure, a device (or computing device) such as user device 102 includes a processor and memory for storing and executing data and software. Computing devices may be provided with operating systems that allow the execution of software applications in order to manipulate data. In the embodiment shown, the user device 102 can be a computing device, such as a personal computer (PC), web enabled personal assistant (PDA), a smart phone, a media player device, a tablet, a game console, smart TV or set top box. The user device 102 is connected to the network 104, such as the Internet, via a wired data connection or wireless connection such as a Wi-Fi network, a satellite network or a cellular telephone network.

The web-based social network 106 can comprise an entity that provides social networking services, communication services, dating services, etc. The social network 106 is hosted by a server. The server can be a single server or a group of servers acting together, either at one location or multiple locations. A number of program modules and data files may be stored in a mass storage device and RAM on the server hosting the social network 106, including an operating system suitable for controlling the operation of social network 106. By way of a non-limiting example, the social network 106 can host a website that allows one or more users, such as the user at the user device 102, to communicate with another user via the social networking website. According to some exemplary embodiments, one or more networks within the social network 106 may be provided for each user. By way of a non-limiting example, the user may have a network comprised of users grouped according to a town, a network grouped according to a university attended, or grouped according to a common field of work, etc.

Furthermore, the social network 106 can offer a broad array of resources and services to users. The social network, which is implemented by at least one server, can be in communication with various other servers that are accessible through various portal services or via a global network 104 to other servers, services and/or data sources 110 from which user data can be obtained. Such servers may include, but are not limited to, an instant messaging server, a music server, an e-mail server, a game server, or a chat server. As will be explained in more detail later in this disclosure, users will be able to interact with each other through use of the servers and portal services while using the social network 106. One exemplary portal for use in this disclosure is the Yahoo! Website (www.yahoo.com). Although some features are discussed in terms of the Yahoo! website it should be understood that the system and method of the present disclosure can be implemented using any portal.

Specifically, portals are web destinations that offer numerous services and properties that provide the user with many opportunities to interact and assemble information about themselves through profiles, as well as through data gathering facilities of the portals and the portal's services. Examples of web based social networks include FACEBOOK, MYSPACE and GOOGLE+, for example. Also, portals have the ability to amass information about the user which is collected from multiple sources or services 110 available to or accessible by the portal website and/or via a global network 104 as user data. Implementing a social network 106 in a portal environment enables numerous points of contact with the portal provide greater opportunity for the social network 106 to gather useful information about the members (or users) of the social network and greatly enhance the value and accuracy of the social network offering.

A content engine 108 can utilize action and relationship information about the one or more users, such as the user at the user device 102, to generate dynamic interest based social pages personalized for users of the social network 106, as discussed below. According to some embodiments, the content engine 108 can comprise a computing device(s), or server(s), in communication with the global network 104, and/or social network 106, comprising a processor and memory for execution of computer-readable instructions, where upon execution of the instructions, the content engine 108 performs the recorded instructions. According to some embodiments, the content engine 108 comprises one or more modules associated with, or directly coupled to the social network 106. Also, in some embodiments, the content engine 108 can be hosted or implemented by a server, which can either be the same server(s) hosting the social network 106, or a server that is in communication with the server hosting the social network 106. The server hosting the content engine 108 can be a single server or a group of servers acting together, either at one location or multiple locations. According to some embodiments, the content engine 108 may communicate with the user device 102 over the global network 104, or a wired or wireless (e.g., cellular) communication network.

The content engine 108 monitors and analyzes user actions and relationships of the users of the social network 106. According to some embodiments, the actions and relationships are based on activity occurring inline with the social network 106. According to some embodiments, user actions and/or relationships can be based on activity occurring outside the social network, where the users actions, behaviors, location information and history of activity is collected through its interactions over the network 104 or collected via a user device such as a computing device, smart phone, tablet computer or the like. For example, a user associated with a user device 102 interacts over the network 104 with the social network 106, and the content engine 108 monitors and analyzes these user interactions. As discussed in more detail below, these user interactions are not limited to interactions solely with the social network. The interactions can include those interactions including, but not limited to, SMS messaging, e-mail, telephone calls, GPS information, and the like.

From this, the content engine 108 generates user interest profiles for each user based on said monitored interactions (or actions), as discussed below.

As discussed below in relation to FIG. 2, each user interest profile is stored by the content engine 108 in an associated database, such as an activity database 202 coupled to the content engine 108. According to some embodiments, the user interest profiles can be stored at the user device 102, where the user interest profile information can be communicated to the social network 106 via the network 104. According to some embodiments, user interest profiles for each user of the social network 106 may be directly coupled with each respective user's social network profile within the social network 106. In some embodiments, the user interest profiles can be stored in a database that is in communication with the social network 106, content engine 108 and/or user device 102.

Figure 2:
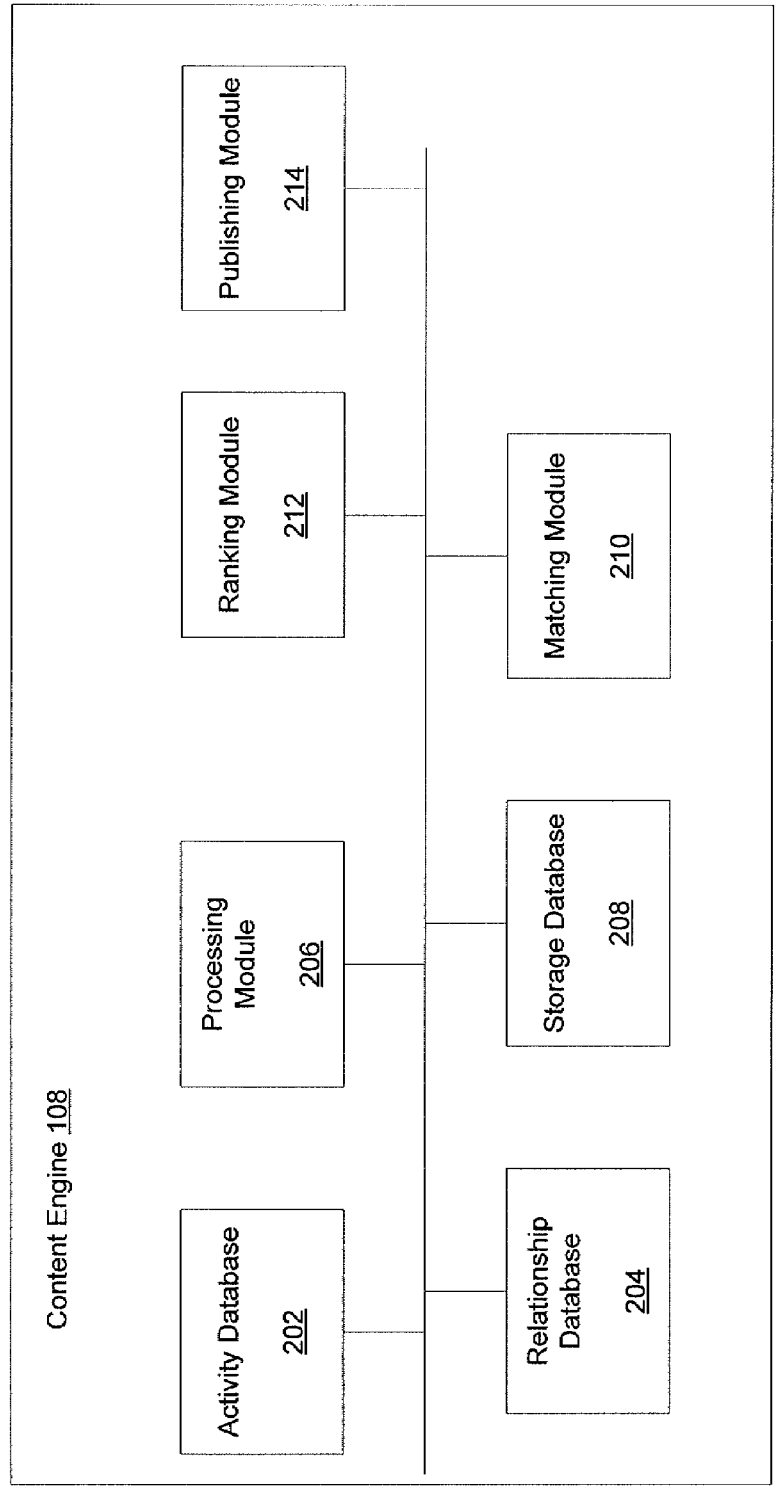
FIG. 2 is a block diagram illustrating exemplary components that can be used for generating a dynamic interest based social page in accordance with embodiments of the present disclosure.

FIG. 2 illustrates embodiments of the content engine 108. According to some exemplary embodiments, the content engine 108 comprises an activity database 202, a relationship database 204, a processing module 206, a storage database 208, a matching module 210, a ranking module 212 and a publishing module 214.

The activity database 202 records the actions (or interactions) for each user that are monitored by the content engine 108. The actions for each user can be periodically or automatically updated. As discussed above, these actions may not be precluded to solely social networking actions, in that the actions can include other activity over the network 104 or other networks. For example, the activity database 202 can store user actions with one or more items of content, such as other user's profiles, news stories, media content existing on the network 104 or social network 106, and/or email provided through the network 104 or social network 106. User action data stored in the activity database 202 can represent a particular user's actions on the social network 106 (or other services on, available to, and/or in communication with global network 104). The action data can be for a period of time or in accordance with an identified frequency of activity. By way of example, John Smith may have searched for content relating to Picasso paintings. The searching could have been performed over the network 104 on Picasso relevant websites, or through portal pages on the social network 106. Thus, action data for John Smith is stored in John Smith's user interest profile within the activity database 202.

Action data can include any data relating to presentable media, such as web pages, audio data, visual data, and audio-visual data. For example, the action data can be data relating to downloaded music, such as genre, artist, album and the like, and includes data regarding ringtones, ringbacks, media purchased, playlists, and media shared, to name a few.

In another example, action data can be data relating to images and/or text received by the user device 102 via the social network 106. This action data can include data relating to images and/or text sent from and/or captured at the user device 102. In another example, action data can be data associated with any videos captured at, downloaded to, or otherwise associated with the user device 102 within the social network 106. Action data can also include media presented to the user at the user device 102 via the social network 106, and includes data relating to text entered and/or received by the user using the social network 106 (e.g., search terms), and interaction with the social network 106 media, such as click data (e.g., advertisement banner clicks, bookmarks, click patterns and the like). Action data can also include data relating to web sites visited, the user's RSS feeds, subscriptions, group memberships, game services, alerts, and the like.

Action data also includes non-social network activity. The action data can be related to activity by a user, as discussed above, which has occurred over the network 104. For example, image capture and/or video capture using the user device 102, such as a mobile phone. This action data can include metadata added by the user, or other data associated with the image, such as, with respect to photos, location when the photos were taken, direction of the shot, content of the shot, and time of day, to name a few. As described in further detail below, action data can be used to deduce activities information and interests for users.

Action data can also include transactional data. The transactional data can be any data associated with commercial transactions undertaken by or at the user device 102, such as vendor information, financial institution information (e.g., bank information), financial account information (e.g., credit card information), merchandise information and costs/prices information, and purchase frequency information, to name a few. This action data can be utilized, for example, to deduce activities and interests for a user. This action data can also be used to deduce types of activities and/or services in which the user can have an interest.

The action data can also include device or other interaction data. Such data includes both data generated by interactions between a user and the social network 106 and interactions between the user and entities on the network 104. This data can relate to interactions not included in any of the above categories, such as habitual patterns associated with use of the user device 102, such as data regarding which applications are used on the user device 102, and how often and when those applications are used.

Therefore, action data can be correlated with other data to deduce information regarding user activities and patterns associated therewith. The table below is a non-exhaustive list including examples of action data.

Examples of Action Data

| Type of Data | Example(s) |
| --- | --- |
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data such as music data (artist, genre, track, album, etc.) |
| | Visual data, such as any web pages, text, images and video data, including Internet data, picture data, podcast data and playlist data |
| | Network interaction data, such as click patterns and channel viewing patterns |
| Device interaction data | Any data not captured above dealing with user interaction of the device, such as patterns of use of the device, applications utilized, and so forth |

By way of a non-limiting example, as a way of further explanation, for all users of the social network 106, action data is generated via the content engine 108 monitoring and analyzing a user's access to a variety of electronic documents, e.g., information documents available at a web site and/or social networking pages. In other words, a user's interest profile comprises the user's action data which is a record of the user's activity. These records represent interests compiled from a user's online activities or, according to some embodiments, the user's declared interests (from their own social page or portal or website profile pages). For example, if a user is searching for paintings, visits museum websites, painting blogs, and/or writes blogs about paintings, the user's actions exhibit an interest in paintings.

According to some embodiments and by way of another non-limiting example, user interest profiles can be automatically generated for action data based on the type of content viewed by the user. The type of content can be determined by the text or type within the parts of the electronic documents viewed and the classifications of the electronic documents viewed. Also, the user interest profiles can be generated based on other factors including the frequency and currency of visits to electronic documents or websites or on-line services having a given classification, and/or the hierarchical depth of the levels or parts of the documents viewed.

The action data can further include identifiers for locating and/or identifying the content from which the action data was created. The identifiers can be stored separately within the user's interest profile within the activity database 202, or can be stored as metadata associated with the action data. For example, if action data was generated as a result of a user searching for and rendering Led Zeppelin songs, the action data will also include information that allows the system to identify that the action data corresponds to Led Zeppelin songs. That is, the action data provides identifiers for providing information related to what type of content, or subject matter was responsible for such action data storage. The action data and the identifying information correlated with the action data is stored in the activity database 202 within a user's interest profile.

The relationship database 204 within the content engine 108 stores relationship information associated with each of the users of the social network 106. According to some embodiments, the relationship information stored in the relationship database 204 can include a user social profile for each user of the social network 106. For example, when a user joins the social network 106, a user social profile is generated for the user. The user can therein specify relationships with other users of the social network 106. The user can assign categories, groups and/or networks for the other users of the social network.

As discussed herein, the relationship information can include social network data. Social network data includes data relating to any relationship that is explicitly defined by, or automatically derived from a user, such as data relating to a user's friends, family, co-workers, business relations, and the like. Social network data can include, for example, data corresponding with a user-maintained electronic address book. Relationship information can be correlated with, for example, location data to deduce social network information, such as primary relationships (e.g., user-spouse, user-children and user-parent relationships) or other relationships (e.g., user-friends, user-co-worker, user-business associate relationships). Relationship information also can be utilized to deduce, for example, action data.

By way of a non-limiting example, a user can designate a second user as a friend, a friend of a friend, a family user, a schoolmate, or any other designation that represents a connection within the social network 106. Also, the user can designate other users within a group or category. The designations of other users can carry privacy or access controls, from which the user may control which other users have access to content, and/or what types of access may be granted to the other users. The relationship database 204 can be periodically or automatically updated with current relationship information. That is, when a user changes, updates, or modifies a connection with another users, either regarding the capacity of a friend, category or group designation, the relationship information in the relationship database 204 is updated.

The content engine 108 employs the processing module 206, as described below in connection with FIG. 3. In general, the processing module 206 is responsible for compiling the action data stored in the activity database 202 and scoring the action data to produce an interest score. Based on the interest score, the users actions are ranked. This information is stored in a user's interest profile within the activity database 202, as will be discussed below.

According to some embodiments, the processing module 206 can associate the user interest profile information with relationship information (and/or the user's social profile). That is, according to some embodiments, a user's interest profile and user social profile may or may not be correlated in order to efficiently house the information for processing.

Storage database 208 is provided for storing the content associated with each user's social page within social network 106. The content that corresponds to, and is typically displayed on a user's social page, is stored in storage database 208. According to some exemplary embodiments, the content in a user's social networking profile is categorized and stored in storage 208. As will be discussed below, this content can be scored, and such scores can also be stored in a user's social networking profile within storage 208. According to some embodiments, the content of a user's social page is updated in real-time or as close to real-time as processing and storage parameters permit, in accordance with a user's social activity and recorded in the storage database 208.

By way of a non-limiting example, content representing a user's social networking activity is categorized, assigned relevant scores according to a type of content, topic, or source, and stored in storage 208. For example, when a user makes an update in his wall, the update is categorized and assigned relevant scores, based on quality of the content. An example of categorized scoring content consumed by User A:

| Interest Category | Content in User's social profile belonging to interest category | content_score$_{user,content}$ |
|---|---|---|
| Painting | Painting Content A | 20 |
| Painting | Painting Content B | 30 |
| Painting | Painting Content C | 28 |
| Drawing | Drawing Content A | 30 |
| Drawing | Drawing Content B | 43 |
| Trekking | Trekking Content A | 25 |
| Reading | Reading Content A | 25 |

User A

For example, if User A exhibits a greater interest on his/her Wall in Picasso paintings over Rothko paintings, and a greater interest in Comedic novels rather than Period novels, within each category respectively (Painting and Reading), Picasso would be scored and ranked above Rothko, and Comedies above Period genre novels. Accordingly, a content score for each content type (and category) within a user's social networking profile is collected and maintained in storage 208. These scores can be assimilated within the user's social network profile and stored in storage 208, as discussed below.

Figure 4:
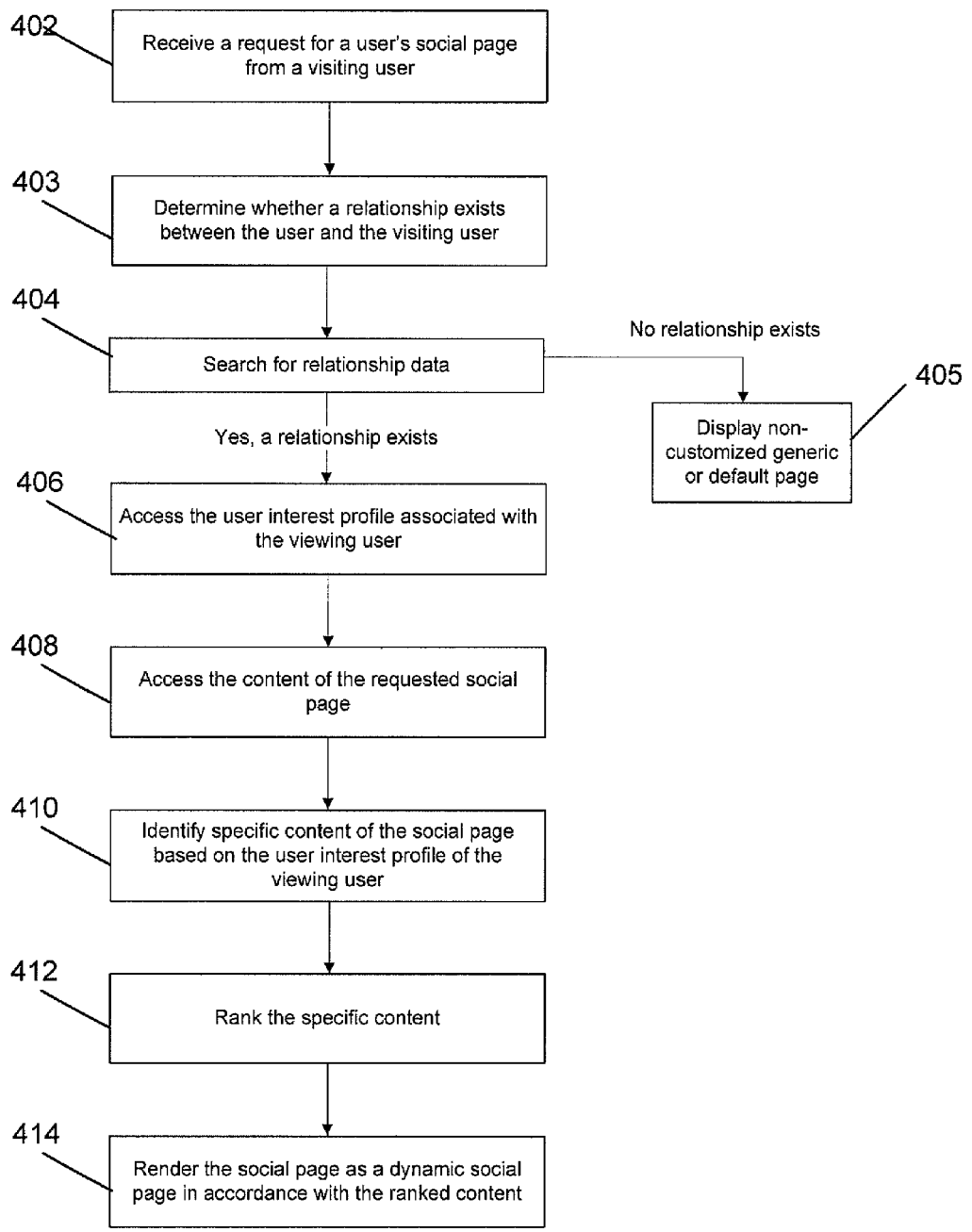
FIG. 4 depicts a process flow for rendering a dynamic interest based social page in accordance with embodiments of the present disclosure.

As discussed in relation to FIG. 4, the matching module 210 and ranking module 212 process the information produced by the processing module 206 (and stored in the activity database 202) and the content stored in the storage database 208. The matching module 210 matches the content of a user's social page with a visiting user's interest profile information, and the ranking module 212 ranks the matched content. The ranked content is then rendered on the user's social page as a dynamic social page that corresponds to the visiting user's interests.

For example, when Visitor V1 requests to view content stored on User A's social page, the processing module 206 identifies the interest scores associated with Visitor V1. These interest scores are affiliated (or associated) with content, content types, or categories of content, as discussed above. The matching module 210 matches these interest scores with content stored in storage 208. That is, content stored in storage 208 has content scores for each item of content, and in some embodiments, each type or category of content. Thus, the matching module 210 matches the interest scores and the content scores. According to some embodiments, the matching module 210 only matches interest scores and content scores when the two scores are associated with the same category. In other embodiments, matches may be made across categories if no direct categorical match is found. For example, if no direct match in a painting category exists, a book or magazine article about a painter or painting could provide a match. A category can be designated according to a content type, topic or content source. It should be understood that the scoring of the content in storage 208 can be calculated in a similar manner in which the visiting interest scores are calculated, as discussed herein.

Therefore, the matching module 210 can compare the scores within the visitor interest profile with the scores for the content in storage 208 in order to identify which content has scores above a threshold. Specifically, for a particular category of content, content scores and interest scores are compared. If the two scores have a score above a predefined threshold, then the relevant content in the storage 208 is identified. The ranking module 212 then ranks the matched content to identify the content that is of most interest to the visiting user. As discussed below, the ranking module ranks the matched content according to a calculation that accounts for the interest score and the content score that produced the match. Publishing module 214 then processes User A's social page content in view of the ranking module 212 output. That is, the publishing module, as discussed below, builds a dynamic social page that is personalized to the visiting users interests. This dynamic social page is rendered via the social network 106. In some embodiments, the publisher 214 modifies the existing social page in order to readily display only the content related to the visiting user's interests.

The content engine 108 employs the publishing module 214 for generating a dynamic social page based on the information from the user interest profile stored in the activity database 202 and the content of another user's social networking profile stored in storage 208. As discussed above, and in further detail below in relation to FIG. 4, the dynamic social page is compiled by the publishing module 214 in accordance with the output from the matching module 210 and the ranking module 212. According to some embodiments, the publishing module 214 can comprise a server configured to facilitate display and communication of a social page to the user of the user device 102.

By way of a non-limiting example, Visitor V1 is requesting to view a social page of User A. As discussed in more detail below, the publishing module 214, based on the output from the processing module 206, matching module 210 and ranking module 212, generates User A's social page in accordance with the user interest profile information associated with Visitor V1. Thus, a dynamic interest-based page is generated for Visitor V1. That is, a version of User A's social page is rendered in accordance with Visitor V1's interests. In a further embodiment, the publishing module 214 can be configured to format content in a predetermined arrangement style for presentation to the user(s) of the social network 106.

Although the exemplary content engine 108 is described as being comprised of the various components discussed herein, fewer or more components may comprise the content engine 108 and still fall within the scope of various embodiments.

Figure 3:
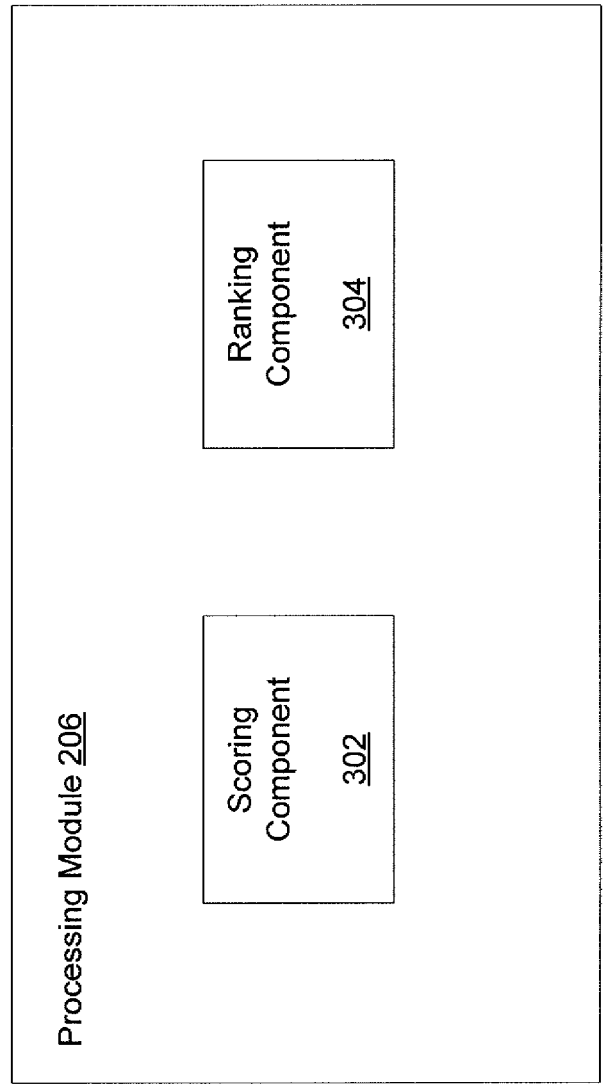
FIG. 3 is a block diagram illustrating exemplary components that can be used for generating a dynamic interest based social page in accordance with embodiments of the present disclosure.

FIG. 3 is a block diagram of an exemplary processing module 206. As discussed above, the processing module 206 is provided for processing the information stored in the activity database 202. The processing module 206 includes a scoring component 302 and a ranking component 304. Although the processing module 206 will be described as being comprised of the listed components herein, fewer or more components may comprise the processing module 206 and still fall within the scope of various embodiments.

According to some embodiments, the scoring component 302 is configured to compile an interest score for a user's action data stored in a user interest profile recorded in the activity database 202. The interest scores indicate a level of interest the user has portrayed via the action data associated with the user. By way of non-limiting example, the action data corresponds to types of websites, electronic documents, media items, and/or the topics and/or content present within each document a user has interacted with for which action data has been recorded. The scoring, performed by the scoring component 302, is based on the quality and quantity of action data. That is, as discussed above, that action data can identify and is associated with content on the network 104 and/or social network 106. This content was generated and/or viewed by the visiting user.

According to some embodiments, scoring can be directly proportional to quality and relevancy of the content. According to some embodiments, scores can be inversely proportional to time elapsed since the content's creation, in that recent content receives a higher score. Scoring may also be directly or indirectly proportional to other types of parameters, including, but not limited to, the type of content, the frequency of visits to the content, the time elapsed when interacting with the content, and if the content is user generated (e.g., the user's blog, user's social page) or accessed by the user (e.g., a site visited by the user). The interest scoring discussed herein is not an exhaustive description of types of scoring. Other methods exist for scoring interest, which one of ordinary skill in the art would understand apply. The following table gives a non-limiting example of scoring. Note, this is not an exhaustive list in terms of different interest types.

| Interest | Score |
|---|---|
| Painting | Score based on: searches related to painting, painting blog visits, commenting on painting blogs, scripting painting blogs etc. |
| Photography | Score based on: uploading/sharing/downloading and commenting on photo sites (e.g., FLICKR), reading/writing on professional photography sites etc. |

The processing module 206 can score the content. By way of non-limiting example, the following formula can be used to compile an interest score for action data within a user's interest profile:

$$\text{visitor\_interest\_score}_{visitor, interest\_category} = \frac{\text{weighted\_score\_of\_interest}}{\text{total\_score\_all\_interests}}$$

That is, the action data within a user's interest profile can be scored, according to a non-limiting example, via content optimization, in that scores are assigned based on an amount and/or frequency of views and clicks by the user. Scores can be weighted (or assigned an affinity) based on past, present or future content interaction. Any type of variable may be considered when determining a weight (or affinity) for weighting the scored content. According to some embodiments, the weighting variable can be determined by a user, the social network 106 or the system. In some embodiments, weights may be utilized to assign an order to the action data stored in the activity database 202.

A user becomes a visitor when he/she visits the social page (or profile) of another user in the social network 106. Therefore, an interest score for a user is calculated according to the weighted score of interest for a particular category of action data being divided by the total interest score of action data for all categories.

By way of a non-limiting example, as illustrated in the chart below, interests of Visitor V1 and Visitor V2 can be scored according to each user's actions over the network 104 and/or social network 106, as discussed above. As shown, "Painting" has the weighted score of 200 for V1. This score is given in comparison to all other users of the social network 106. Therefore, based on the above formula, the interest score for "Painting" was calculated by 200 (weighted score for "Painting") being divided by the total score 1000 (total score). The grade for the weighted scores is from zero (0) to infinity. A user who is not at all interested in "Painting" receives a score of zero, whereas other users receive a score that is weighted depending on their activity in view of other users' activity (or action data). Thus, for example, V1 has a greater interest in "Painting" than V2; therefore V1 has a higher score relative to V2. The user who has the maximum activity on "Painting" both qualitatively and quantitatively can receive the maximum score.

| Interest Category | Weighted Score | visitor_interest_score$_{visitor, interest\_category}$ |
|---|---|---|
| | | Visitor V1 |
| Painting | 200 | 0.20 |
| Drawing | 300 | 0.30 |
| Trekking | 250 | 0.25 |
| Reading | 250 | 0.25 |
| Total score | 1000 | |
| | | Visitor V2 |
| Painting | 100 | 0.166 |
| Drawing | 400 | 0.677 |
| Trekking | 10 | 0.0169 |
| Reading | 90 | 0.152 |
| Total score | 590 | |

By way of a non-limiting example, a score for an online video for "Painting" can be quantitatively measured by how often and how long a user watches or replays the video. For example, one way of determining the weighted interest score of a video is to collect user data representing interactions by users with an item of media, referred to as action data as discussed above. The action data can be analyzed to determine which media items users of the social network are viewing most, and which users are viewing the videos more than others. In other words, which videos receive the most user attention, and which users are providing that attention. The disclosed system learns from user behavior and feedback related to a media item, and identifies the media items and users that are interacting. The collected and stored action data, which is recorded in the activity database 202, can then be used to make quantitative measurements. In other words, the data can be analyzed using known techniques to provide a mathematical and/or visual representation of the data. Additionally, the quantitative measurements can be based on how often a portion, point or segment is consumed by a user, or similar user.

Thus, the user interest profiles comprise interest scores for each user categorized according to the type of content viewed, e.g., category or grouping. For example, as shown above, Visitor V1 has exhibited an interest in the a content type related to "Painting". That is, Visitor V1 has, for example, viewed social network pages and/or blogs related to paintings. The interest scores compiled by the scoring component 302 are stored in the activity database 202 within a "Painting" category in accordance with the user's interest profile.

As discussed above, the interests for each category can be ranked, which is performed by the ranking component 304. For example, Visitor V1 may have shown a great interest in paintings by Michelangelo as opposed to Leonardo Di Vinci. Thus, within Visitor V1's interest profile, within the Painting category, Michelangelo would be ranked above Di Vinci. By way of another example, in accordance with a non-limited manner in collecting and updating user interest information for a user, the content engine 108 can maintain and automatically update the user interest profile for each user according to information most recently or frequently requested and accessed by the user. That is, a user's action data can be updated in real-time according to the user's current activity, or most recent activity.

According to some embodiments, the rankings produced within categories of a user interest profile by the ranking component 304 can be represented as a set of single n coordinates, for example. The set of n coordinates can identify a position, via the score, within an n-dimensional space that represents a spectrum of topics of interest. The position of the set of n coordinates in the n-dimensional space represents a user's level of relative interest in the topics represented in the spectrum. The topics are gathered from the information documents the user has interacted with. Each of the topics may be categorized, in that relative ranks can exist within a categorical hierarchy.

Note, that various embodiments of the disclosed system and method could draw a distinction between favorite interests and top interests. For example, a user could designate a set of interests as favorite interests, but only designate a subset of such interests as top interests.

FIG. 4 illustrates a flow chart of an exemplary embodiment for generating a dynamic personalized page of a user's social page for a visiting user. In step 402, the visiting user submits a request to the social network 106 for access to another user's social page. For ease in explanation, the owner of the social page will be referred to as "first user", and the requesting user will be referred to as "visiting user".

According to some embodiments, in Step 403, it is determined whether a relationship exists between the visiting user and the first user. The determination of the relationship is performed by searching the relationship database 204 for any type of connection that may exist between the users. Step 404. If a relationship does not exist, the process proceeds to Step 405. In some embodiments, for example, Step 405 results in the visiting user receiving an indication that he/she does not have access to the first user's social page. Access, as discussed above, is based upon privacy determinations, friend status, groupings or categorizations between the users, which is stored in the relationship database 204. Therefore, for example, a visiting user may have low level access to the first user's social page, in that the content the visiting user would be interested in may be blocked by the first user. Thus, the relationship determination of Steps 403 and 404 would still result in the result of Step 405, where for example, a non-customized page will be displayed. That is, the requested social page in a generic form or default form would be displayed for the visiting user. However, according to some embodiments, if the first user has not restricted content on his/her social page, in that relationship status between the first user and the visiting user is inconsequential, then the process would continue to Step 406.

If a relationship does exist, the user interest profile information for the visiting user is accessed. Step 406. Specifically, the ranked interest scores within the visiting user's interest profile are accessed (or retrieved) from the activity database 202. In Step 408, content for the first user's social page is accessed from storage 208. That is, content that is specific to the first user, and allocated to the social page being requested, is accessed. This content is correlated with the first user's social networking profile. As discussed above, this content is also assigned a content score. Therefore, according to some embodiments, the content scores associated with the accessed content are identified and accessed.

In Step 410, the user interest score for the visiting user and the content of the social page are matched. That is, according to some embodiments, the user interest scores from the visiting user's interest profile and the content scores associated with the first user's social page are matched. As discussed above, the matching module 210 compares the scores within the visitor interest profile with the scores for the content in storage 208 in order to identify which content has scores above a threshold. According to some exemplary embodiments, only interest and content scores related to a similar category of content are compared. If the two scores have a score above a predefined threshold, then the relevant content in the storage 208 is identified. According to some embodiments, the scores are not compared against a threshold. If the two scores are within a predetermined range, or in some embodiments equal to one another, then a match has occurred.

According to some alternative embodiments, content affiliated to the visiting user interests, which are dictated by the visiting user's interest score, is identified. This is achieved by the content correlated with the visiting user's interest score being identified and matched to content that is present within the first user's social page. The content associated with the interest scores is identified via the action data in the visiting user's interest profile. In other words, the interest scores are associated with content or a type of content. This association may also be stored in the activity database 202, in that, as discussed above, the user interest profile can store an indication that provides an identifier or link to the content for which the score was a product of. This content is then matched with content from the social page that is stored in storage 208. These steps are performed by the processing module 206, and more specifically, the matching module 210. That is the matching module 210 can account for the information computed by the processing module's 206 scoring and ranking components 302, 304, and comparatively matches the content associated with the interest scores stored in the activity database 202 with the content stored in the storage database 208.

According to some embodiments, matching accounts for only the content associated with the highest interest scores (per category). According to some embodiments, matching is a FIFO (first in first out), or a LIFO (last in first out) process that traverses the user interest profile for associated content that is most desired by a user. According to some embodiments, gradations of the interest scores may arise, in that only the top view interest scores may play a factor in generating the dynamic social page. For example, if a user's interest scores within the category "Music" show an interest in decreasing order for: Funk, Rock and Jazz, gradations may exist where only Funk will be processed because it is associated with the highest interest scores. However, embodiments exist where all three, the bottom two, or any other combination of processing related to action data's interest scores.

By way of another illustrative example, visiting user A may exhibit an interest in music, paintings and sports. Thus, the content on first user B's social page relating to music, paintings and sports will be matched. However, if first user B only has content on his/her social page related to music and sports, the system will account for this, and only process the relevant content. In circumstances where content of first user's social page does not correspond to the visiting user's expressed interests, the system can then equate the interests to similar genres (or types) of content, and provides the similar content as a replacement. For example, if visiting user has exhibited an interest in Eric Clapton songs, and first user's social page has content related to Lou Reed but not Eric Clapton, the system can resolve this lack of content (or categorical) overlap, and provide the Lou Reed content based on a similar musical genre.

In Step 412, the matched (or identified) scores are ranked by the ranking module 212 of the content engine 108. That is, the content scores that match interest scores are assigned a content rank. According to some embodiments, the content is ranked via the ranking module 212 applying the following formula:

$$\text{content\_rank}_{visitor,user,content} = F(\text{content\_score}_{user,content,interest\_category}, \text{visitor\_interest\_score}_{visitor,interest\_category})$$

F=function which assigns a rank to a content in users profile based on visitor's interest The effect of applying this function results in surfacing the content which is most relevant to the visiting user. That is, the content of the first user's social page which corresponds to the highest interest score(s) of the visiting user is identified.

For example, one possible content rank calculation is described herein. Note, content rank calculation is not limited to these calculations.

Multiply the first user's content score in a category with the visitor's interest score from the same category:

$$\text{content\_rank}_{visitor,user,content} = \text{content\_score}_{user,content,interest\_category} \times \text{visitor\_interest\_score}_{visitor,interest\_category}$$

content_score$_{user,content,interest\_category}$=score for content present in a user's profile belonging to a category visitor_interest_score$_{visitor,interest\_category}$=score for a visitor interest category Therefore, as shown in the table below, content rank is calculated based on the content score for the first user (User A) and the interest score for the visiting user (Visitor V1). For example, based on the above calculations: Visitor V1 accessing User A's social page.

| Interest Category | Content in User's profile | content_score$_A$ (User A) (First User) | visitor_interest_score$_{V1}$ (Visitor V1) (Visiting User) | content_rank |
|---|---|---|---|---|
| Painting | Painting Content A | 20 | 0.20 | 4.0 |
| Painting | Painting Content B | 30 | 0.20 | 6.0 |
| Painting | Painting Content C | 28 | 0.20 | 5.6 |
| Drawing | Drawing Content A | 30 | 0.30 | 9.0 |
| Drawing | Drawing Content B | 43 | 0.30 | 12.9 |
| Trekking | Trekking Content A | 25 | 0.25 | 6.25 |
| Reading | Reading Content A | 25 | 0.25 | 6.25 |

According to some embodiments, the content of the User A's social page (first user) may be ordered based on the rank in non-decreasing order of the rank and presented to the Visitor V1 (visiting user), as pictured in the above table. Step 414. According to some embodiments, User A's social page (first user) can be ordered in decreasing order, or another order that readily relates to Visitor V1's interests (visiting user). Therefore, as above discussed in FIGS. 2-4, the process ultimately finds the content in the first user's social page, matches the content with a visitor's interest profile, and renders a dynamic page with this content. That is, the rendered dynamic personalized social page enables the visiting user to view what content on the first user's social page that matters to him or her most. According to some embodiments, the visiting user can be an entity that is trolling for information related to users of a social network. The visiting user can also be an employment of a search engine which is searching a social network for relevant information resultant of a search request/query.

According to some embodiments, the page layout of the dynamic social page may change according to preferences specified by the visiting user's interest profile. In some embodiments, the layout may be content specific, and/or, designated by the social network or a user of the social page. As such, in some embodiments, there may be different page layouts for presenting different categories of content. For example, if content belongs to a entertainment category, the layout will have a movie theme in the background. In another example, if the content is related to research, the layout of may include research themed, e.g., a library background, images of test tubes or laboratory scene.

The dynamic page lends towards better user engagement with the social network and with other users, and increases user satisfaction, in that the visiting user is readily able to locate and interact with content they desire without having to manually search for such content.

Figure 5A:
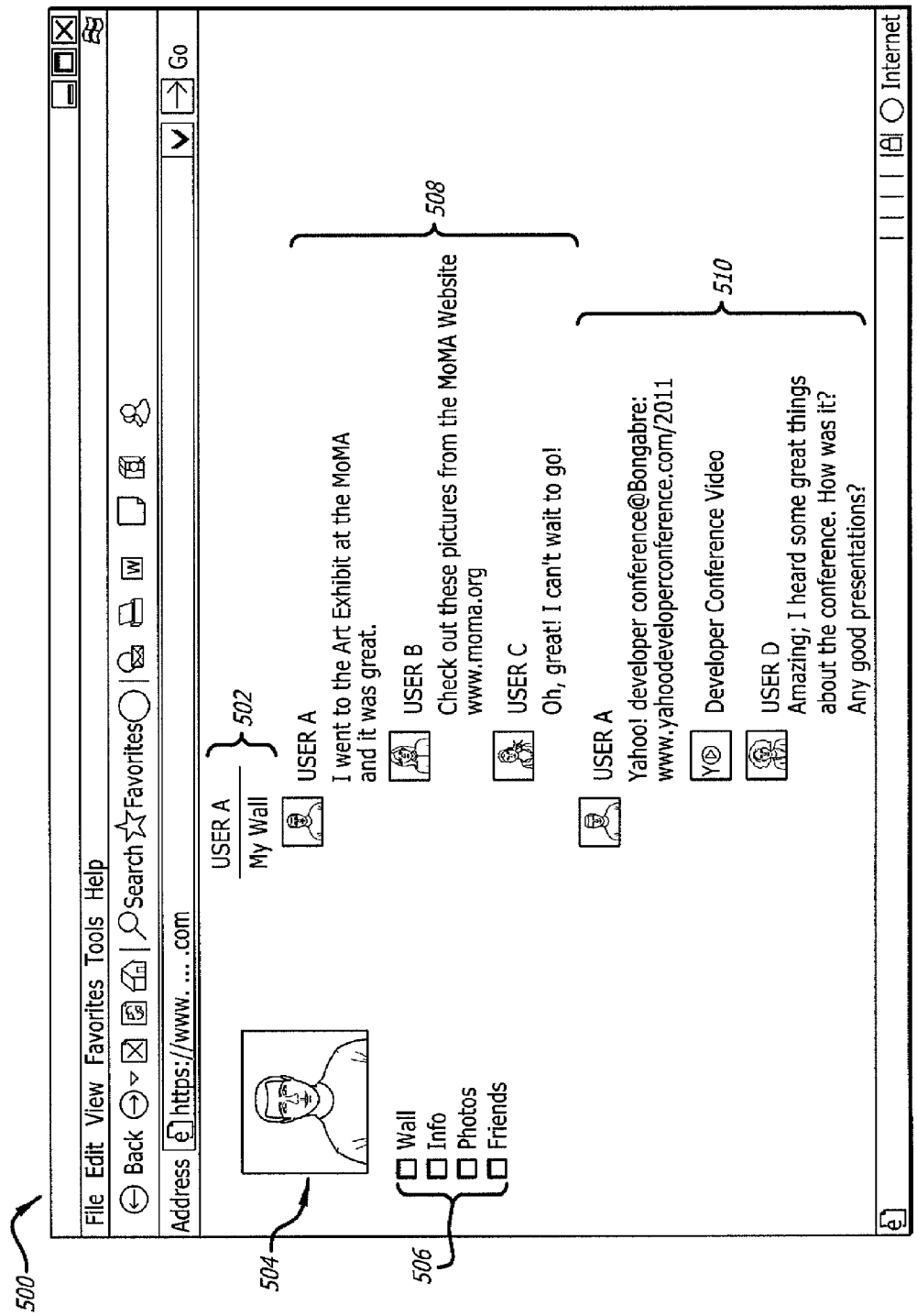
FIGS. 5A and 5B depict embodiments of a dynamic personalized social page in accordance with the present disclosure.
Figure 5B:
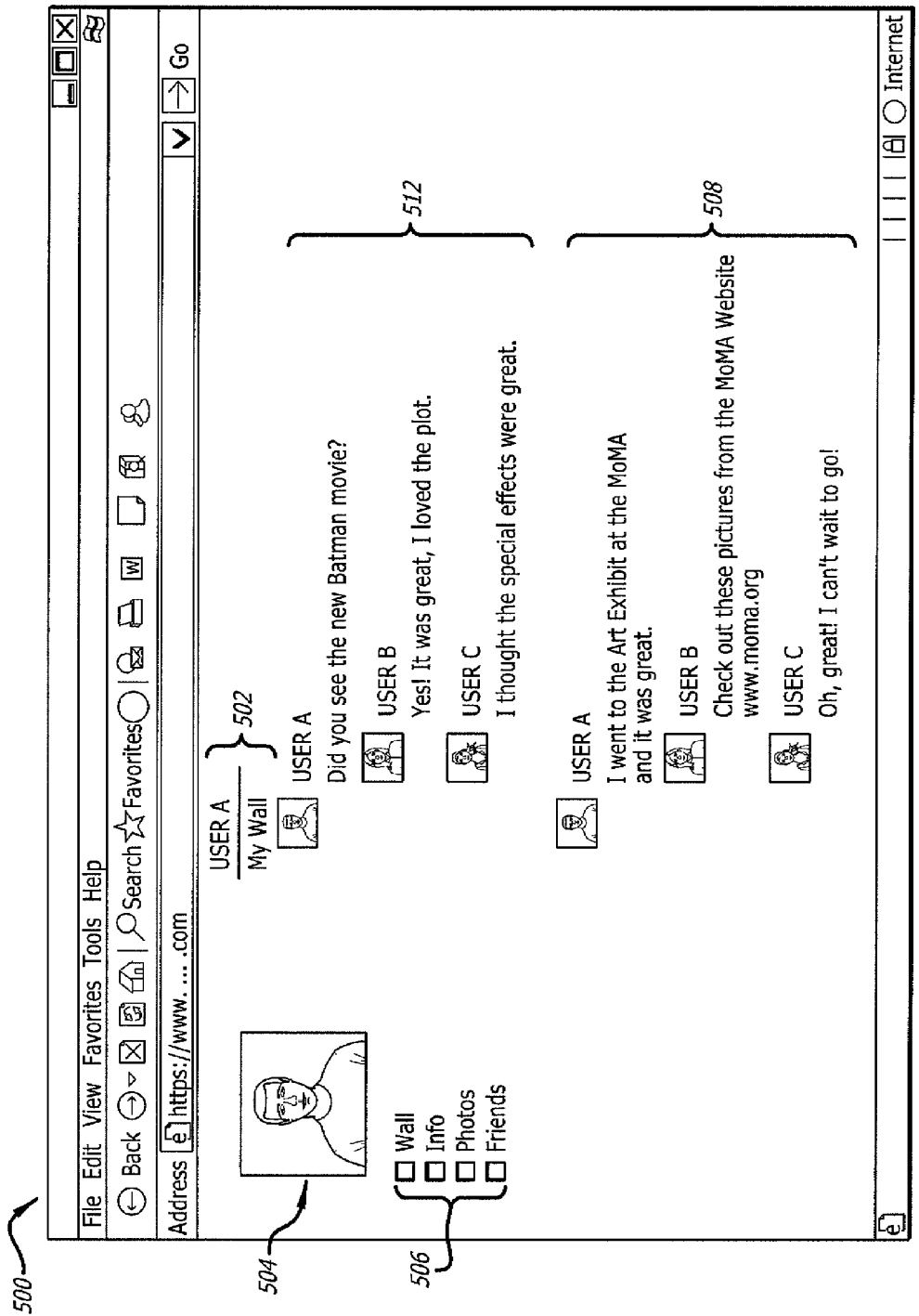

FIGS. 5A and 5B depict examples of a displayed social network page comprising items of a generated dynamic interest-based social page that is personalized for a visiting user. The social page 500 represents the display page of a user that is dynamically rendered in association with a visiting user's interests, as discussed above in relation to FIG. 4. Various stories, images, video and other content, and so forth can be displayed via the display page, which is the dynamic social page, in accordance with the visiting user's interest profile, as discussed above.

According to the illustrated examples in FIGS. 5A-B, which depict examples of a rendered dynamic social page in accordance with an embodiment of the present disclosure, the social page 500 displayed belongs to User A. This can be readily identified by User A's profile photo 504 being displayed on the top left corner of the social page 500, as is common practice within social networking Note, the placement of profile photo 504 is for illustrative purposes, and can be located anywhere on the page, and/or not displayed on the page. The visiting user in FIG. 5A is referred to as Visitor V1. The visiting user in FIG. 5B is referred to as Visitor V2. Visitor V1 and Visitor V2 are two separate users, with differing interests, as discussed below.

Turning to FIG. 5A, the social page 500 in this example is User A's Wall 502. This is merely an illustrative embodiment, in that the social page 500 can be any of User A's pages associated with his social networking profile. For example, the page 500 can be that of photos, information about User A, and/or friends of User A and the like, as referenced by, but not limited to, item 506. The information on the social page 500 is tailored to Visitor V1's interests when Visitor V1 requests the Wall 502 of User A, as discussed above.

Items 508, 510 reference content that has been surfaced from User A's Wall 502 in relation to Visitor V1's interests, as explained with reference to FIG. 4. That is, User A's Wall 502 has been tailored to meet Visitor V1's interests 508, 510. As illustrated, and by way of example, Visitor V1 is interested in Art/Painting 508 and has also identified/declared himself as working in the Computer/Technology 510 industry.

For example, within Visitor V1's interest profile, the Art/Painting category 508 has a higher interest score rank than Computers/Technology 510. Thus, as displayed, the original content on User A's Wall 502 has been dynamically rendered to correspond to Visitor V1's ranked interests. Because Art/Painting 508 has a higher interest score than Computer/Technology 510, content on User A's Wall 502 related to Art/Painting 508 will be displayed above content on User A's wall related to Computer/Technology 510.

By way of further example, a first story within the surfaced content related to Art/Painting 508, states, "I went to the art exhibit at the 'MoMA and it was great". This story has been identified as being of most interest to Visitor V1 within the Art/Painting 508 category according to the process described in FIG. 4. For example, this could be due to Visitor V1's action data and relevant interest scores exhibiting Visitor V1's great interest in art exhibits at the Museum of Modern Art (MoMA).

The first story within the surfaced content related to Computer/Technology 510 states "Yahoo! developer conference @ Bangalore: www.yahoodeveloperconference.com/2011". This story states that a developer conference is occurring in Bangalore, India, and the link is provided. Thus, according to Visitor V1's interests, a developer conference is of the highest interest. Each story on Wall 502 has been assigned a ranked content score, as discussed above. Thus, the stories that correspond most readily to Visitor V1's categorical interests, as expressed by Visitor V1's interest profile, are displayed on the Wall 502 of User A.

Turning to FIG. 5B, the information displayed on the social page 500 of User A has been tailored to meet Visitor V2's interests. As illustrated, and by way of example, Visitor V2 is interested in Movies 512 and Art/Painting 508. However, contrary to Visitor V1's interests, Art/Painting 508 has not received the highest interest score within Visitor V2's interest profile. For Visitor V2, Movies 512 has a higher interest score than Art/Painting 508. Thus, as displayed, the content on User A's Wall 502 has been dynamically rendered to correspond Visitor V2's interests: Music 512 and Art/Painting 508. Indeed, because Music 512 has a higher interest score than Art/Painting 508, content on User A's Wall 502 related to Music 512 will be displayed above content on User A's Wall 502 related to Art/Painting 508.

As shown in FIGS. 5A-5B, User A's social page 500 will be dynamically rendered according to the visiting user's interests. In FIG. 5A, Visitor V1 was viewing the page; therefore, the Wall 502 was dynamically rendered according to Visitor V1's interests. In FIG. 5B, Visitor V2 was viewing the page; therefore, the Wall 502 was dynamically rendered according to Visitor V2's interests. The dynamic rendering of a social page, such as User A's Wall 502, displays the content that corresponds to the visiting user's interests. The display of the ranked content, as discussed above, accounts for the visiting user's interests, and not the interests of other visiting users, as shown in FIGS. 5A-5B. For example, in FIG. 5A, Visitor V1's top interest was Art/Painting 508; therefore, the content on User A's Wall 502 related to Art/Painting 508 was displayed at the top of the page. However, as shown in FIG. 5B, Visitor V2's interests expressed a desire to view Music 512 content before Art/Painting 508. Therefore, upon Visitor V2 viewing the Wall 502, the content for Music 512 was displayed above content related to Art/Painting 508. Also, since Visitor V1 does not exhibit an interest in Music 512, content related to Music 512 was not displayed on the dynamic rendering of the social page for Visitor V1, as seen in FIG. 5A. Similarly, since Visitor V2 did not express an interest in Computer/Technology 510, content related to Computer/Technology 510 was not displayed in FIG. 5B.

According to some embodiments, a visiting user may represent a category of users, or a group. Thus, the dynamic rendering of a social page 500 may account for interests of more than one viewing user. For example, User A is an alumni of University of Florida and has a category of friends that are also alumni. Embodiments exist where, upon one of the user's from the alumni category viewing User A's social page 500, a customized version of the social page 500 can take into account all of the user's interests within the alumni category, and dynamically render the social page 500 in accordance with their compiled interests.

The examples depicted in FIGS. 5A-5B are for illustrative purposes only, in that the Wall 502 can comprise any combination of comments, messages, images, videos, links, recommendations, or the like. Any type of communication or content depiction that typically occurs via a social networking website (or page) can be readily processed and displayed in accordance with the embodiments discussed herein.

FIG. 6 illustrates components that can be used in connection with one or more embodiments of the present disclosure. In accordance with one or more embodiments of the present disclosure, one or more computing devices, e.g., one or more servers, user devices 102 or other computing devices, are configured to comprise the functionality described herein. For example, a computing device 602, as discussed in FIG. 1 in relation to user device 102, can be configured to execute program code, instructions, etc. to provide functionality in accordance with one or more embodiments of the present disclosure. One or more of server computing device 602 can be configured to provide functionality of the web-based social network 106 and the content engine 108. Server 602 can be associated with one or more of data store(s) 608. Data store 608 can comprise, among other things, document and index storage, user profiles and/or query log(s), for example. As discussed above, the data store may comprise the storage 208 as discussed in relation to the content engine 108. The data store 608 can also comprise storage for the activity database 202 and/or the relationship database 204. Additionally, data store 608 can store program code to configure a server 602 to execute to provide functionality described herein. Server computing device 602 can serve content to user computing devices 604 via a browser application executing at user computing device 604 via a network 104.

The user computing device 604, which can be user device 102, can be any computing device, including without limitation a personal computer, personal digital assistant (PDA), wireless device, cell phone, internet appliance, media player, home theater system, and media center, tablet, game console or the like. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a server computing device 602 can make a user interface available to a user computing device 604 via the network 104. The user interface made available to the user computing device 604 can include content items, or identifiers (e.g., URLs) selected for the user interface in accordance with one or more embodiments of the present disclosure. In accordance with one or more embodiments, server computing device 602 makes a user interface available to a user computing device 604 by communicating a definition of the user interface to the user computing device 604 via the network 104. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 104 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suite as the Internet. Two of the most important elements in the suite are the transmission control protocol (TCP) and the Internet protocol (IP).

It should be apparent that embodiments of the present disclosure can be implemented in a client-server environment such as that shown in FIG. 6. Alternatively, embodiments of the present disclosure can be implemented other environments, e.g., a peer-to-peer environment as one non-limiting example.

Figure 7:
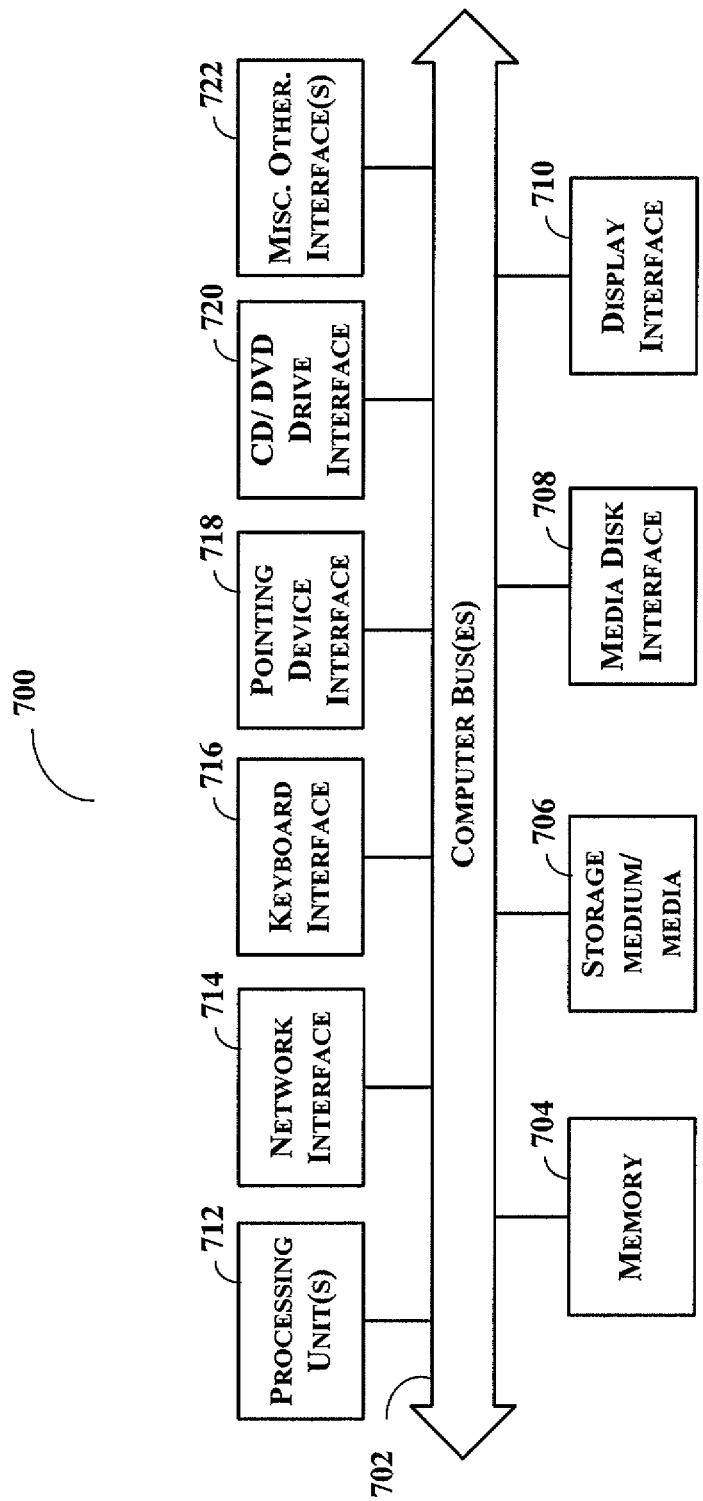
FIG. 7 is a block diagram illustrating an internal architecture of a computing device in accordance with one or more embodiments of the present disclosure.

FIG. 7 is a block diagram illustrating an internal architecture of a computing device, e.g., a computing device such as server 602 or user computing device 604 (user device 102), in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

For the purposes of this disclosure the term "user" should be understood to refer to a member of a social network and/or a consumer of data supplied by a data provider. By way of example, and not limitation, the term "user" can refer to a person who receives data provided by the data provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A method comprising:
receiving a request from a second user of a social network for a social page associated with a first user of the social network;
accessing, via a server, a user interest profile associated with the second user, the user interest profile comprising interest scores associated with activity related to interests of the second user, said interest scores corresponding to types of content that said second user has interacted with during said activity, each second user interest score is grouped according to an interest category and ranked within the respective interest category based on other interests scores in the interest category;
accessing, via the server, a social networking profile of the first user, the social networking profile comprising content scores for information on the social page of the first user, each content score is grouped according to a content category;
determining, via the server, which interest scores and content scores are within a similar category;
for each determined category, matching, via the server, the second user's interest score and the content scores;
identifying, via the server, the content scores of the first user that correspond to the second user's interest scores based on the said matching;
ranking, via the server, the identified content scores of the first user in accordance with the second user's interest scores; and
identifying, via the server, the information that corresponds to each ranked content score.

2. The method of claim 1, further comprising:
generating the social page of the first user comprising the information corresponding to the ranked content scores.

3. The method of claim 1, further comprising:
modifying the social page of the first user in order to facilitate visibly display of the information corresponding to the ranked content scores.

4. The method of claim 1, wherein each category relates to a type of content.

5. The method of claim 1, wherein each category relates to a specific topic.

6. The method of claim 1, wherein said matching comprises determining whether the second user's interest scores and the content scores are above a threshold.

7. The method of claim 1, further comprising: for each matched score within each determined category, calculating a content rank based on the second user's interest score and the content score; and generating a dynamic social page in accordance with information related the category with a highest content rank, said information derived from the first user's social networking profile.

8. The method of claim 1, wherein the second user's interest scores are based on an affinity assigned to each individual interest score in view of a total score for the second user's interests.

9. The method of claim 1, wherein the social network is a computerized service that implements a portal environment for communicating information to and from users of the social network, the social network utilizing information available through various portal services of the portal environment that each user has interacted with, and integrating said information within the social network.

10. A non-transitory computer-readable storage medium tangibly encoded with computer-executable instructions, that when executed by at least one processor of a computing device, perform a method comprising:
receiving a request from a second user of a social network for a social page associated with a first user of the social network;
accessing a user interest profile associated with the second user, the user interest profile comprising interest scores associated with activity related to interests of the second user, said interest scores corresponding to types of content that said second user has interacted with during said activity, each second user interest score is grouped according to an interest category and ranked within the respective interest category based on other interests scores in the interest category;
accessing a social networking profile of the first user, the social networking profile comprising content scores for information on the social page of the first user each content score is grouped according to a content category;
determining which interest scores and content scores are within a similar category;
for each determined category, matching the second user's interest score and the content scores;
identifying, based on the matching, the content scores of the first user that correspond to the second user's interest scores;
ranking the identified content scores of the first user in accordance with the second user's interest scores; and
identifying the information that corresponds to each ranked content score.

11. The non-transitory computer-readable storage medium of claim 10, further comprising:
generating the social page of the first user comprising only the information corresponding to the ranked content scores.

12. The non-transitory computer-readable storage medium of claim 10, wherein said matching further comprises determining whether the second user's interest scores and the content scores are above a threshold.

13. The non-transitory computer-readable storage medium of claim 12, further comprising:
for each matched score within each determined category, calculating a content rank based on the second user's interest score and the content score; and
generating a dynamic social page in accordance with information related the category with a highest content rank, said information derived from the first user's social networking profile.

14. A system comprising:
a plurality of processors;
an activity database for storing activity by each user of a social network, said activity stored as action data within an interest profile for said each user;
a relationship database for storing relationship information for said each user of the social network, said relationship information comprising data relating to a user's relationships with other users of the social network;
a processing module, implemented by at least one processor of said plurality of processors, for scoring the action data stored in the activity database for each user of users to produce each interest score, said each interest score of the interest scores that is grouped according to a category, is stored within the category, in association with a content within the interest profile of a particular user within the activity database, wherein said each interest score within the category is ranked based on the interests scores;
a storage database for storing contents associated with each user's social page within the social network, the storage database comprises content scores for the stored content, each stored content of the stored contents and associated content scores are categorized within the storage database, wherein each content score of the content scores are grouped according to the category;
a matching module, implemented by at least one of said plurality of processors, for determining which interest scores and content scores are within a similar category; and for each determined category, matching the interest score with a second user with the content scores of a first user within the similar category; and
a ranking module, implemented by at least one of said plurality of processors, for ranking the content scores that match the interest score.

15. The system of claim 14, further comprising:
a publishing module, implemented by at least one of said plurality of processors, for generating a social page of a user comprising the content corresponding to the ranked content scores.

16. The system of claim 15, wherein said processing module further comprises:
a scoring component for weighing the action data of a user in view of other users' action data to produce said interest score; and
a ranking component for ranking the interest score against other interest scores within the category within the interest profile.

* * * * *